(12) United States Patent
Nishi et al.

(10) Patent No.: US 7,216,430 B2
(45) Date of Patent: May 15, 2007

(54) ROLLING BEARING, AND CRANK SHAFT BEARING

(75) Inventors: Kengo Nishi, Iwata (JP); Kouichi Tsuji, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 141 days.

(21) Appl. No.: 10/501,304

(22) PCT Filed: Jan. 17, 2003

(86) PCT No.: PCT/JP03/00393

§ 371 (c)(1),
(2), (4) Date: Jun. 16, 2005

(87) PCT Pub. No.: WO03/062658

PCT Pub. Date: Jul. 31, 2003

(65) Prior Publication Data

US 2005/0259904 A1    Nov. 24, 2005

(30) Foreign Application Priority Data

Jan. 18, 2002  (JP) ............................. 2002-009855

(51) Int. Cl.
*B21D 53/00* (2006.01)

(52) U.S. Cl. ................................................ 29/898.054
(58) Field of Classification Search ........... 29/898.054, 29/898.056, 898.057; 384/273, 288, 294
See application file for complete search history.

(56) References Cited

FOREIGN PATENT DOCUMENTS

| DE | 15 75 497 A1 | 1/1970 |
|----|--------------|--------|
| FR | 501 092 A    | 4/1920 |
| GB | 1092667      | 11/1967 |

OTHER PUBLICATIONS

Patent Abstracts Jap, Oct. 31, 1998, Koyo Seiko.
Supplementary European Search Report.

*Primary Examiner*—Lenard A. Footland
(74) *Attorney, Agent, or Firm*—Ernest A Beutler

(57) ABSTRACT

To form a dividing portion 21 of an outer ring 13 so that a dividing line is of a crankshaft shape as seen in the axial direction while first and second race ring halves 16, 17 fit to each other. The dividing portion 21 is formed so that first dividing surfaces located on the side of the inside cylindrical surface 14 are in contact with each other in the state of being attached to a cylinder body and a crankcase. The dividing portion 21 is also formed so that a clearance S is produced between third dividing surfaces on radially outer side.

3 Claims, 4 Drawing Sheets

ROLLING BEARING, AND CRANK SHAFT BEARING

DETAILED DESCRIPTION OF THE INVENTION

1. Field of the Invention

This invention relates to a rolling bearing and a crankshaft bearing for example with the outer ring formed as divided in the radial direction.

2. Background Art

Conventionally a bearing formed to be dividable in the radial direction has been used to support the intermediate portion of a rotary shaft. For example in the case where part of a crankshaft between cylinders of a multi-cylinder engine is to be supported, a divided type of slide bearing is used. This slide bearing for supporting the crankshaft has an outer ring, divided into a first half and a second half, secured to the cylinder body and the crankcase, with these two halves holding between them the journal portion of the crankshaft for rotation.

Since the rotary friction resistance is greater with the slide bearing than with the rolling bearing, for an engine to be capable of rotating at higher revolutions, it is preferable to replace the slide bearing supporting the middle portion of the crankshaft with a rolling bearing.

As an example of divided type of rolling bearing, there is one disclosed in JP-A-Hei10-18474. As for the bearing disclosed in this publication, its race ring is subject to a heat-treatment to enhance its hardness, the race ring is finish to be in the final state, and divided by the so-called natural dividing. The natural dividing is a method in which for example a blade is placed on the end face of the outer ring to strike-divide the outer ring so that it is divided in the radial direction.

With the conventional rolling bearing of the divided type formed as described above, however, roundness of the race surface is sometimes degraded in the state of the bearing being attached to a mating member, or a minute step appears along the dividing line of the race surface. The worsened roundness of the race surface or the difference in height formed on the race surface as described above causes part of the rolling body to be rubbed hard with rolling members. After a long period of time in use, that part of surface is likely to come off in the flaking phenomenon, and the durability of the bearing lowers extremely.

The cause of the decrease in the roundness or the appearance of the difference in height as described above is thought to be that the residual stress caused by the heat treatment for improving the race surface hardness is released at the time of dividing, resulting in a slight deformation of the race ring half.

This invention has been made to solve the above problem. It is therefore an object of the invention to provide a divided type of rolling bearing that makes it possible to maintain the roundness of the race surface while preventing the difference in height from being produced on the race surface.

DISCLOSURE OF THE INVENTION

To achieve the above object, a rolling bearing according to the invention is formed that a dividing portion of a race ring is formed so that its dividing line is in the shape of a crankshaft as seen in the axial direction, the race ring halves fit to each other, the dividing surfaces of the dividing portion located on the race surface side are in contact with each other in the state of being attached to the object members for attachment, with a clearance formed between the dividing surfaces located on the radially opposite side of the race surface.

The race ring of the bearing according to the invention makes it possible by mutually fitting the race ring halves to position one race ring half relative to the other race ring half in both fitting direction and radial direction at right angles to the fitting direction.

The bearing of claim 2 is the rolling bearing of claim 1, wherein finishing process is applied to the race surface in the state of the race ring halves being combined together.

The bearing according to this invention can be made to be in the same state as being attached to the object members for attachment even in the state of not being attached to by making the race ring halves fit to each other. Therefore, it is possible to arrange that, in the above-described temporarily assembled state, the race surface is formed to be in the final state by applying heat treatment and polishing to the race surface, the race ring halves are separated from each other to attach them to the object members for attachment, and the race surface is restored to the same state as that of the time the finishing process was applied.

The crankshaft bearing of claim 3 is the one in which the rolling bearing of claim 1 or 2 is attached to the crankcase with the race ring serving as an outer ring, a race surface is formed on the crankshaft, and the race ring is made to support the crankshaft through rolling members.

According to this invention, the middle part of the crankshaft to which the outer ring cannot be fit from either end can be rotatably supported with the rolling bearing.

BEST MODE FOR EMBODYING THE INVENTION

An embodiment of a bearing according to the invention is described in detail in reference to FIGS. 1 to 4. An example is described here in which one end of a crankshaft of a single-cylinder engine is supported with a crankshaft bearing according to the invention.

Figure 1:
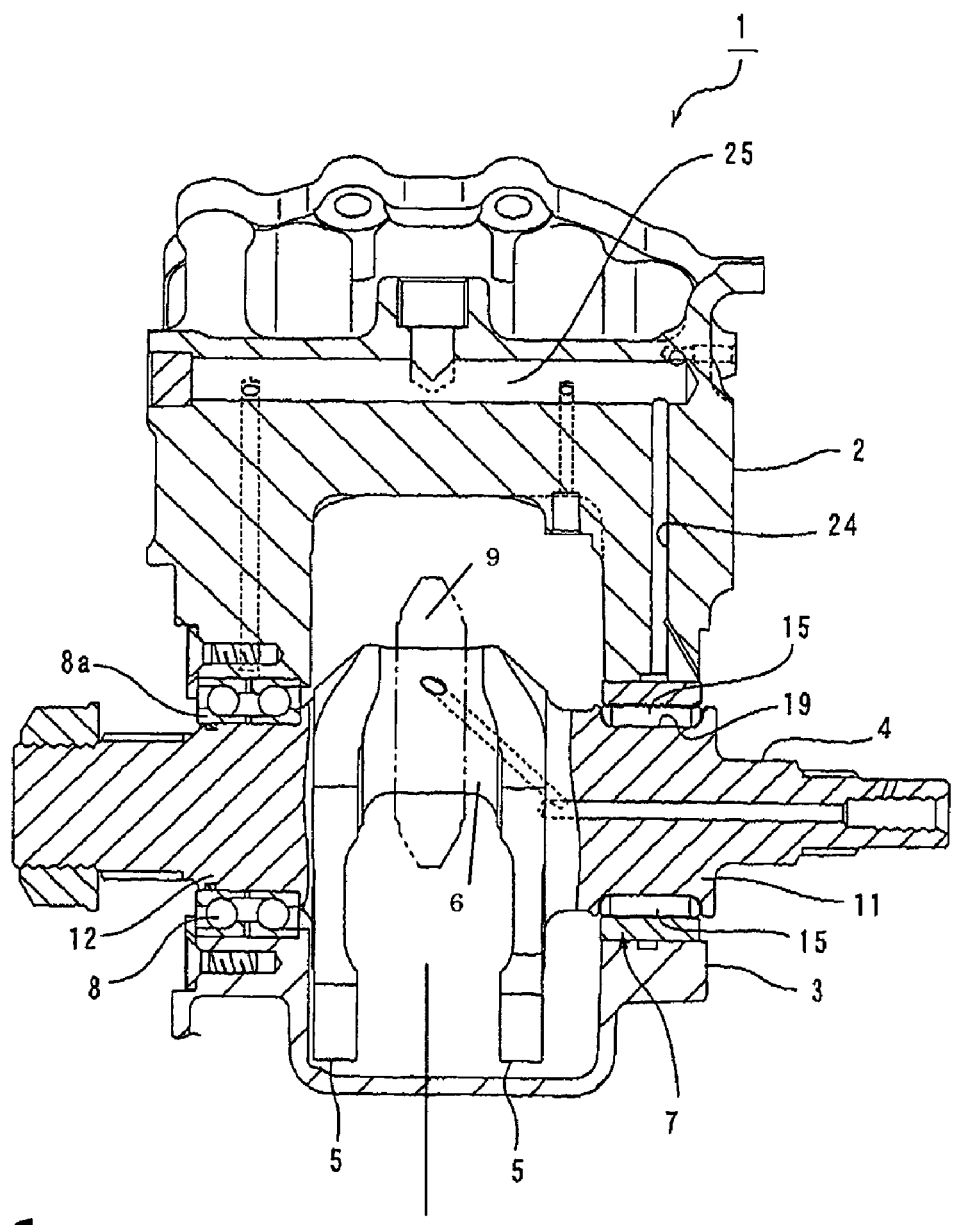
FIG. 1 is a sectional view of an engine including a bearing according to the invention.
Figure 2:
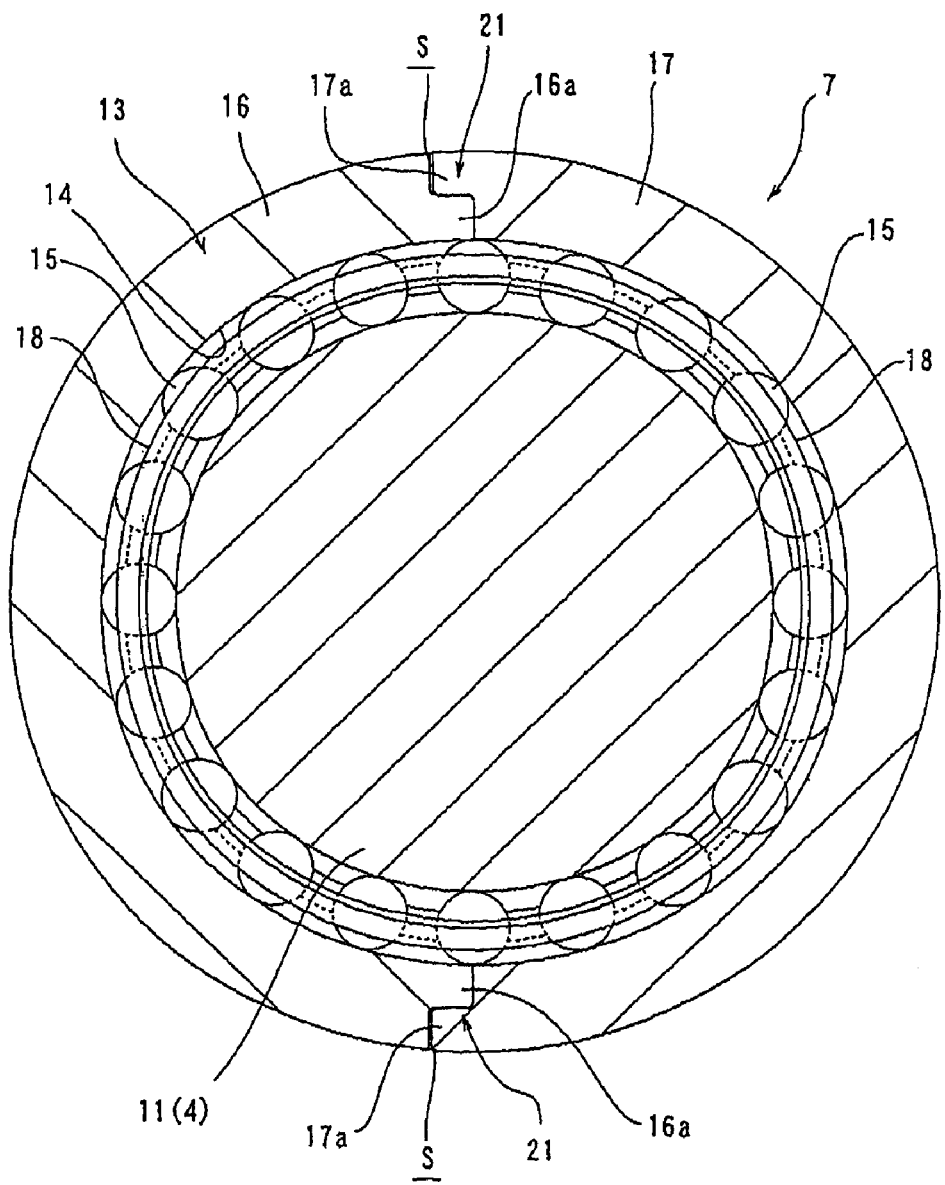
FIG. 2 is a sectional view of a crankshaft bearing according to the invention.
Figure 3:
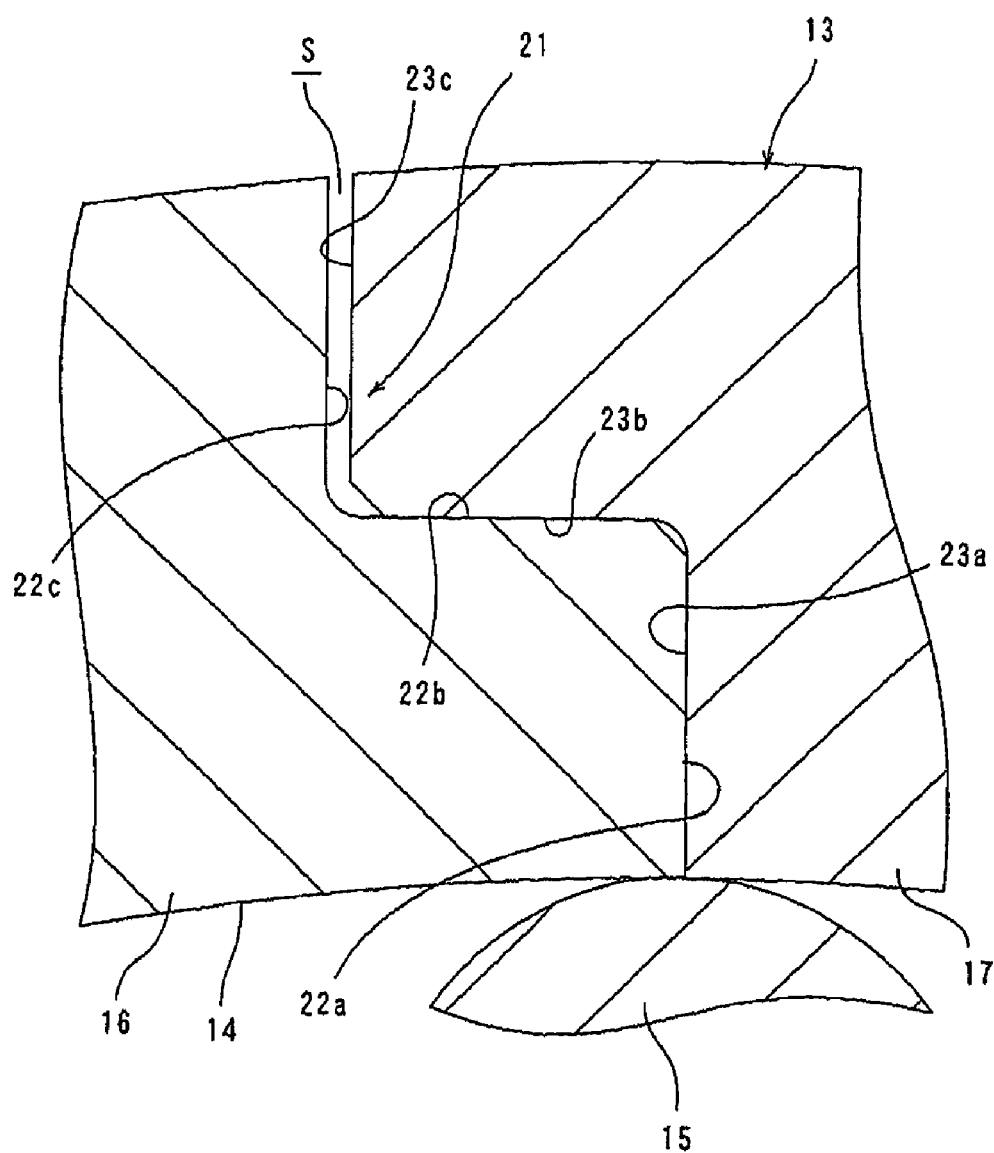
FIG. 3 is an enlarged sectional view of an essential part.
Figure 4:
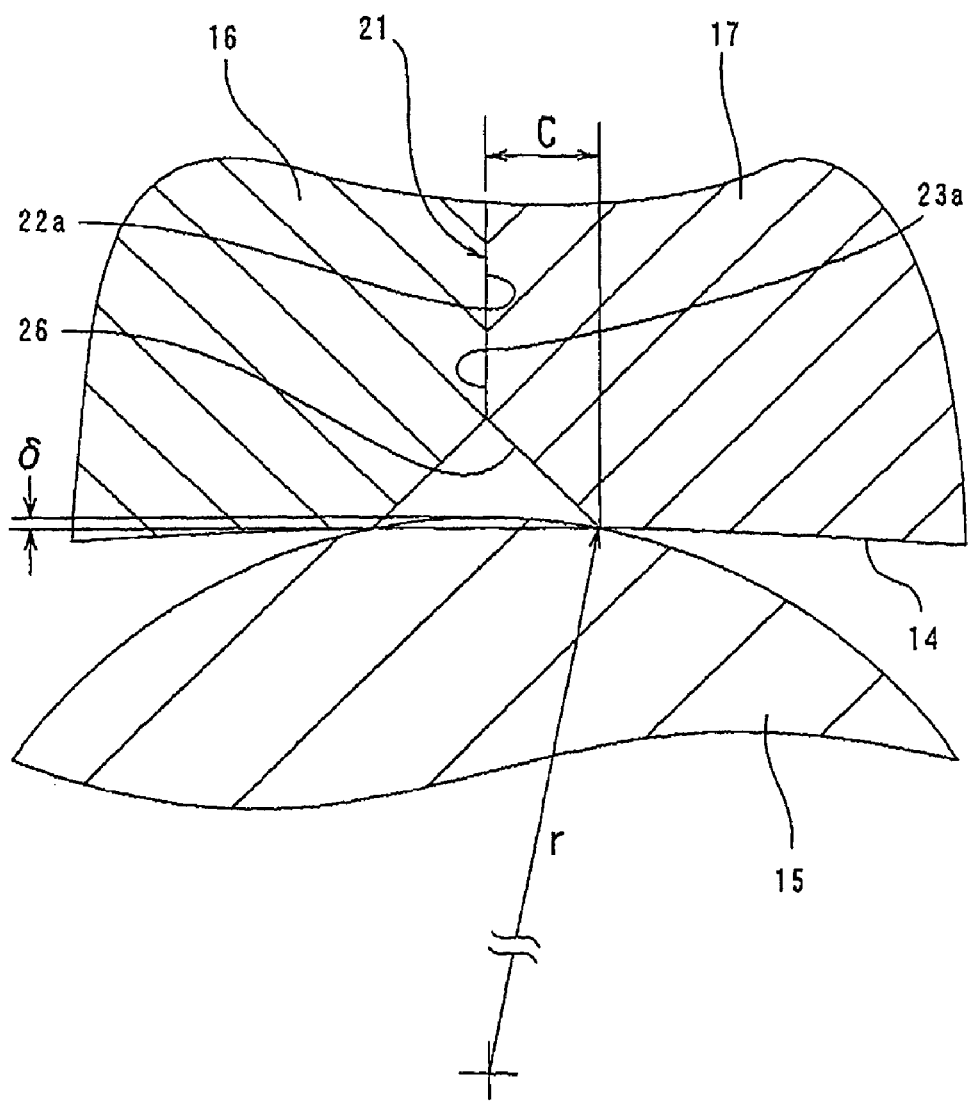
FIG. 4 is an enlarged sectional view of a dividing portion of a race surface.

FIG. 1 is a sectional view of an engine including a bearing according to the invention, FIG. 2 is a sectional view of a crankshaft bearing according to the invention, FIG. 3 is an enlarged sectional view of an essential part, and FIG. 4 is an enlarged sectional view of a dividing portion of a race surface.

In these figures, reference numeral 1 stands for a four-stroke engine according to this embodiment. Reference numeral 2 indicates the cylinder body of the engine 1, numeral 3 a crankcase, and numeral 4 a crankshaft, respectively.

The crankshaft 4, like the one generally used for single-cylinder engines, is provided with a crank pin 6 between a pair of crank webs 5, 5, and supported by the cylinder body 2 and the crankcase 3, for rotation on its both end portions through bearings 7, 8 which will be described later. The crank pin 6 by the cylinder body 2 and the crankcase 3, supports rotatably the big end of a connecting rod 9.

A journal portion 11 formed on one end portion of the crankshaft 4 on the right hand as seen in FIG. 1 is rotatably supported with a rolling bearing 7 according to the invention. A journal portion 12 on the other end portion is rotatably supported with a combined angular ball bearing 8 conventionally well-known.

The rolling bearing 7, as shown in FIGS. 1 and 2, is a needle bearing formed with an outer ring 13 (race ring) attached to the cylinder body 2 and a large number of needles 15 (rolling members) interposed between the inside cylindrical surface 14 (race surface) of the outer ring 13 and the journal portion 11 of the crankshaft 4, with the outer ring 13 formed to be dividable into a first race ring half 16 and a second race ring half 17. The needles 15 are held between the outer ring 13 and the journal portion 11 of the crankshaft 4 by means of two cages 18, 18 formed as divided in the radial direction.

The journal portion 11 of the crankshaft 4 supported by the rolling bearing 7, as shown in FIG. 1, restricts the needles 15 from moving axially as the needles 15 are placed to be capable of rolling in an annular groove 19.

The bottom surface and both inside side surfaces of the annular groove 19 have a hardness enhanced by heat treatment, and are polished followed by lapped. The inside race surface of the rolling bearing 7 is formed with the bottom surface of the annular groove 19.

The first race ring half 16 and the second ring half 17 that constitute the outer ring 13 are formed each in a C-shape in cross section. The first race ring half 16 located on the left hand in FIGS. 2 and 3 is provided, at its both end portions on the side of the inside cylindrical surface 14, with fitting projections 16a. On the other hand, the second race ring half 17 has, at its both end portions on the side of the outside cylindrical surface, fitting projections 17a. Therefore, dividing portions 21 in two positions of the outer ring 13 are formed so that their dividing lines are in a crankshaft shape as seen in the axial direction while the first and second race ring halves 16 and 17 fit to each other.

The constitution of the dividing portion 21 is described further in detail, referring to FIG. 3. The dividing portion 21 is made up of: first dividing surfaces 22a, 23a extending radially outward from the inside cylindrical surface 14 of the outer ring 13, second dividing surfaces 22b, 23b extending from the fore-ends of the first dividing surfaces 22a, 23a toward left as seen in FIG. 3 (in the fitting direction of both halves), and third dividing surfaces 22c, 23c extending from the fore-ends of the second dividing surfaces 22b, 23b radially outward. The first dividing surfaces 22a and 23a are formed to be in contact with each other in the state of the first and second race ring halves 16 and 17 being attached to the cylinder body 2 and the crankcase 3. In this embodiment, the first and second race ring halves 16 and 17 are formed so that the first dividing surfaces 22a and 23a press each other in the attached state described above.

The second dividing surfaces 22b and 23b are in contact with each other in the above attached state and restrict relative displacement of the first race ring half 16 and the second race ring half 17 in the radial direction (vertical direction in FIGS. 2 and 3) at right angles to the fitting direction.

The third dividing surface 22c of the first race ring half 16 and the third dividing surface 23c of the second race ring half 17 oppose each other through a clearance S so as to permit relative displacement of the both race ring halves 16 and 17 in the fitting direction.

In this way, forming the clearance S between the third dividing surfaces 22c and 23c makes it possible to securely bring the first dividing surfaces 22a and 23a into mutual contact when the first race ring half 16 and the second race ring half 17 are made to fit to each other and at the same time to cause the pressing force of one half against the other half to act only onto the first dividing surfaces 22a and 23a when the both halves 16 and 17 are attached to the cylinder body 2 and the crankcase 3 as shown in FIG. 1.

In FIG. 1, reference numeral 24 stands for a lubricant oil passage extending upward from the outer ring 13 through the cylinder body 2. The lubricant oil passage 24 is formed to be connected to a main lubricant oil passage 25 of the cylinder body 2 to deliver lubricant oil to the vicinity of an upper portion of the outer ring 13 in the outside portion of the cylinder body 2. Lubricant oil delivered to that portion is drawn from the axial end face side of the outer ring 13 with negative pressure in the crankcase 3 into the rolling bearing 7, and flows out into the crank chamber 27 after lubricating the interior of the bearing including the needles 15.

To produce the outer ring 13, the first race ring half 16 and the second race ring half 17 are formed respectively in specified shapes and finishing process is applied to the first to third dividing surfaces 22a to 22c and 23a to 23c so that this place becomes the final state. Next, the first race ring half 16 and the second race ring half 17 are made to fit to each other and held in the same state as they are attached to the engine 1, heat treatment for enhancing hardness is applied to the inside cylindrical surface 14 of the outer ring 13, and finishing process is applied so as to be formed with the roundness as designed.

The inside cylindrical surface 14 is finished mainly by honing. After applying the mechanical process as described above, a film may be formed on the entire inside cylindrical surface 14 to reduce coefficient of friction or further enhance hardness. As the film of this kind, there are for example one formed by the PVD (physical vapor deposition) method and the DLC (diamond-like carbon) film. Incidentally, the above coating film may also be formed on the journal portion 11 of the crankshaft 4 and the cage 18. Finishing process by polishing such as lapping is applied to the outside cylindrical surface of the outer ring 13 of this embodiment.

After forming the inside cylindrical surface 14 of the outer ring 13 into the final state as described above, the first race ring half 16 and the second race ring half 17 are separated from each other and secured to the cylinder body 2 and the crankcase 3. After that, an assembly made by holding the needles 15 with the cage 18 is attached to the journal portion 11 of the crankshaft 4, and the crankshaft 4 and the crankcase 3 are attached to the cylinder body 2 so that that assembly and the journal portion 11 are held between the first and second race ring halves 16 and 17. Incidentally, the inner ring 8a (See FIG. 1) of the bearing 8 is attached in advance to an end, opposite the rolling bearing 7, of the crankshaft 4, so that also the bearing 8 is held between the cylinder body 2 and the crankcase 3 when the crankshaft 4 is installed as described above.

While the first race ring half 16 and the second race ring half 17 are attached in advance to the cylinder body 2 and the crankcase 3 as described above, it is otherwise possible to attach them, in the state of being held with the crankshaft 4 through the needles 15, together with the crankshaft 4, to the cylinder body 2 and the crankcase 3.

After attaching the crankshaft 4 to the cylinder body 2 and the crankcase 3, the crankcase 3 is tightly joined to the cylinder body 2 using securing bolts (not shown) to complete the attaching work of the crankshaft 4.

The outer ring 13 of the rolling bearing 7 constituted as described above makes it possible to position one race ring half relative to the other race ring half in both fitting direction and radial direction at right angles to the fitting direction by fitting the first and second race ring halves 16 and 17 to each other.

Thus, since it is possible to form the inside cylindrical surface 14 of the outer ring 13 with designed roundness and form the dividing portion of the race surface with smoothness without a difference in height, the rolling bearing 7 remains free from flaking phenomenon even after a long period of use.

The dividing portion of the inside cylindrical surface 14 is located at the fore-ends of the first and second race ring halves 16 and 17, and may be chamfered as shown in FIG. 4 so as not to come into contact with and damage other members. The chamfer plane is indicated with reference numeral 26 in FIG. 4. When the chamfer is to be provided, a difference $\delta$ in height formed with the chamfered portion must be formed to be 5$\mu$ or less so as to prevent flaking phenomenon from occurring. The chamfering dimension C for meeting this condition may be obtained as $C=\{r^2-(r-\delta)^2\}^{1/2}$, where r stands for the radius of the race surface of the outer ring 13.

According to the above algebraic formula, in the case for example r=20 mm and $\delta$=5 $\mu$m, C=0.447 mm.

In other words, since ordinary chamfer can be processed in the vicinity of C=0.2 mm, it is possible to provide a chamfer so that the difference $\delta$ in height is smaller than 5$\mu$m. Therefore, it can be said that this rolling bearing 7 does not decrease in durability even if a clearance is formed by a chamfer of about 0.2 mm at the edge portions of the first and second race ring halves 16 and 17.

Moreover, this rolling bearing 7 makes it possible, even in the state of the first and second race ring halves 16 and 17 not being attached to the cylinder body 2 and the crankcase 3, to bring about temporarily the same state as attached, by fitting the first and second race ring halves 16 and 17 to each other. Therefore, as shown with this embodiment, after the inside cylindrical surface 14 is formed to become the final state by applying heat treatment and polishing to the inside cylindrical surface 14 in the state of being attached temporarily as described above, the first and second race ring halves 16 and 17 are separated from each other and attached to the cylinder body 2 and the crankcase 3, to restore the inside circumferential surface 14 to the same state as that of the time the finishing process was applied. As a result, it is possible to form the inside cylindrical surface 14 with a higher accuracy.

While an example is shown in the above embodiment in which the rolling bearing 7 according to this invention supports the crankshaft 4 of the single cylinder engine 1, the rolling bearing 7 may be used on a crankshaft for example like a crankshaft for a multi-cylinder engine in which a bearing outer ring cannot be fit from either end to the middle of the axial direction. Employing this constitution makes it possible to reduce resistance during rotation in comparison with the case in which the middle portion of the crankshaft is supported with a slide bearing and to rotate the crankshaft at a higher revolution.

Moreover, while an example shown in the above embodiment in which this invention is applied to a needle bearing, this invention may also be applied to other types of rolling bearings.

INDUSTRIAL AVAILABILITY

The rolling bearing according to this invention as described above makes it possible to position one race ring half relative to the other race ring half in both fitting direction and radial direction at right angles to the fitting direction by fitting the first and second race ring halves to each other. Therefore, it is possible to form the race surface with designed accuracy along with forming the dividing portion of the race surface with a smooth surface without a difference in height.

Thus, since it is possible to reduce rotary resistance by supporting the middle portion of the crankshaft of an engine with the rolling bearing, an engine is realized that is capable of rotating at a higher revolution.

With the invention of claim 2, after temporarily combining together the race ring halves and applying a finish process, the race ring halves are separated from each other and attached to object members for attachment, so that the race surface is restored to the same state as the state of the time the finishing process was applied. Therefore, it is possible to form the race surface with a higher accuracy.

With the invention of claim 3, since part of middle portion of a crankshaft to which a bearing outer ring cannot be fit from either end portion can be rotatably supported with a rolling bearing, rotary resistance of the crankshaft is reduced in comparison with the case in which the middle portion is supported with a slide bearing and to rotate the crankshaft at a higher revolution.

The invention claimed is:

1. A method of forming an antifriction bearing for journaling a cylindrical portion of a shaft, said method comprising the steps of forming an outer race ring having an inner race surface for rolling engagement with a plurality of roller members that are adapted to engage the shaft cylindrical portion, and divided into two portions having stepped ends comprised of abutting radially inner portions and radial outer portions joined by generally cylindrical portions, and forming a clearance between the radially outer portions.

2. The method as set forth in claim 1 further including the step of applying a surface finishing process to the inner race surface when the race ring portions are held together with the inner stepped portions are held in abutment and the clearance exists between the radially outer portions without the rollers being received within the inner race surface.

3. The method as set forth in claim 2 further including the step of positioning rollers around the cylindrical portion of the shaft, and affixing the bearings in position there with by assembling the outer race ring with the clearance between their radial outer portions.

* * * * *